United States Patent [19]

Kassai

[11] Patent Number: 4,619,542
[45] Date of Patent: Oct. 28, 1986

[54] BABY CARRIAGE GRIP ROD LOCKING MECHANISM

[75] Inventor: Kenzou Kassai, Osaka, Japan

[73] Assignee: Aprica Kassai Kabushikikaisha, Osaka, Japan

[21] Appl. No.: 712,707

[22] Filed: Mar. 15, 1985

[30] Foreign Application Priority Data

Mar. 23, 1984 [JP] Japan ................... 59-56718

[51] Int. Cl.⁴ .................... F16C 11/00; F16D 1/00
[52] U.S. Cl. .................... 403/62; 403/93; 403/100; 403/102; 403/325; 16/354; 16/324; 280/644; 297/363
[58] Field of Search .......... 403/62, 84, 92, 93, 403/96, 100, 101, 102, 325; 16/354, 324; 297/363, 355, 369; 280/644, 642, 650, 658

[56] References Cited

U.S. PATENT DOCUMENTS

| | | | |
|---|---|---|---|
| 477,109 | 6/1892 | Flocke | 403/325 X |
| 575,266 | 1/1897 | McCollum et al. | 403/92 X |
| 635,744 | 10/1899 | Catudal | 403/96 X |
| 663,195 | 12/1900 | McGuire | 403/93 X |
| 698,137 | 4/1902 | Porter | 403/325 X |
| 2,554,292 | 5/1951 | Brown | 403/59 X |
| 2,632,440 | 3/1953 | Hauser et al. | 403/62 X |
| 2,683,321 | 7/1954 | Faber | 403/62 X |
| 4,191,397 | 3/1980 | Kassai | 403/92 X |
| 4,407,045 | 10/1983 | Boothe | 403/92 X |
| 4,545,599 | 10/1985 | Kassai | 403/92 X |

FOREIGN PATENT DOCUMENTS 4013 of 1902 United Kingdom ............ 403/62

Primary Examiner—Cornelius J. Husar
Assistant Examiner—Todd G. Williams
Attorney, Agent, or Firm—W. G. Fasse; D. H. Kane, Jr.

[57] ABSTRACT

A locking mechanism for a divided grip rod of a foldable baby carriage permits automatically locking the grip rod in an unfolded state and this locking can be canceled by a simple operation. The grip rod (2) is divided into two portions (2a, 2b), which are interconnected at their ends while being supported for rotation around the axes of parallel rotary shafts (6). Lateral surfaces of the ends of the portions of the grip rod intersect the rotary shafts. Each lateral surface has a locking recess (12). A locking plate (4) is movable axially of the rotary shafts so that it can fit simultaneously in the two locking recesses when the grip rod is in its straight state. The locking plate is urged by a spring in the direction in which it fits in the locking recesses for normally maintaining the locked state. An unlocking member (5) is provided to for disengaging the locking plate from the locking recesses against the force of the spring to permit folding of the grip rod.

9 Claims, 18 Drawing Figures

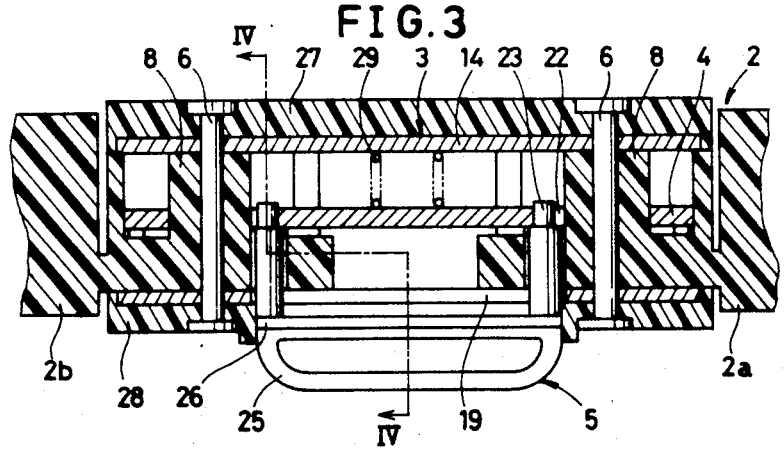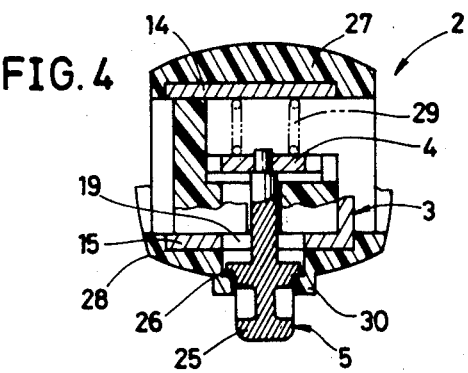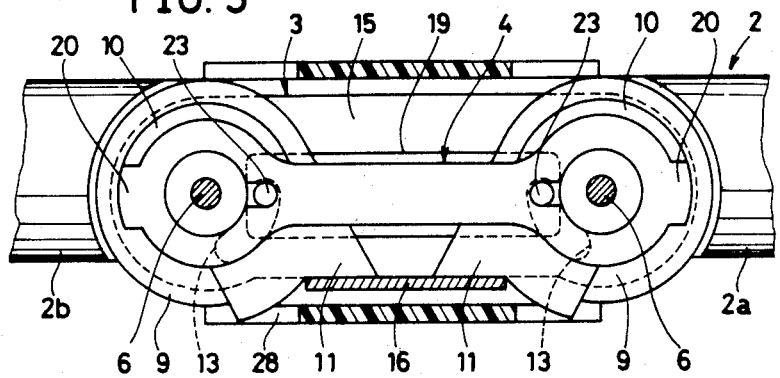

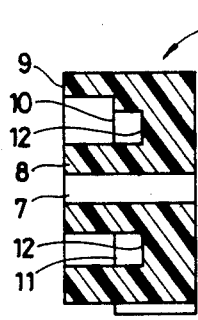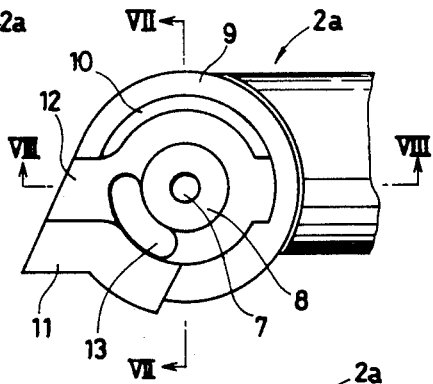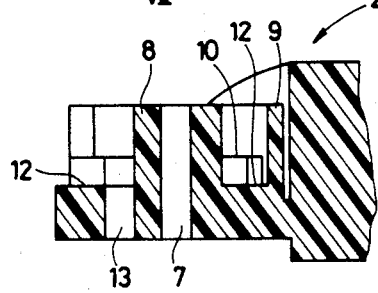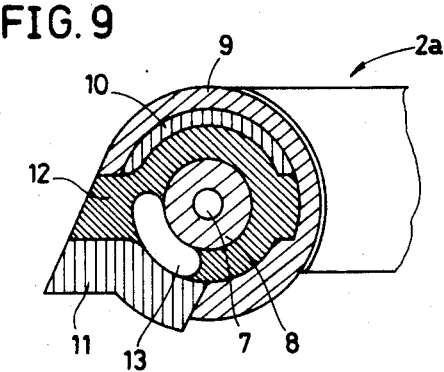

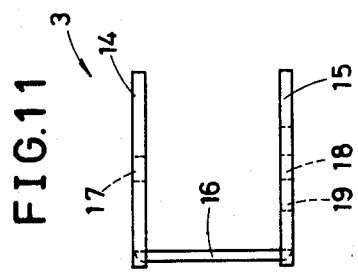
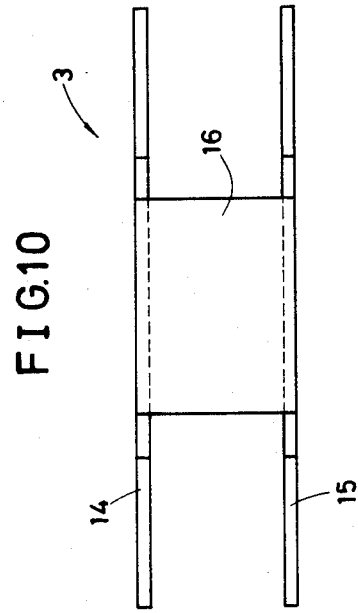
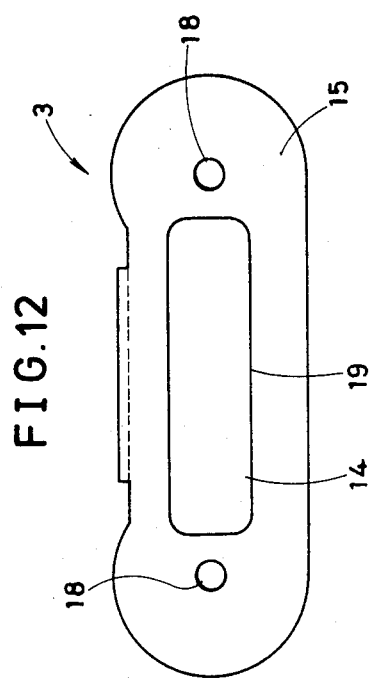

4,619,542

BABY CARRIAGE GRIP ROD LOCKING MECHANISM

BACKGROUND OF THE INVENTION

This invention relates to a mechanism for locking the grip rod of a baby carriage, in a straight operational state. The grip rod interconnects the pair of push rods of the carriage and is foldable at its middle when the carriage is not in use. More particularly, in a foldable baby carriage in which the distance between the push rods is increased or decreased when the baby carriage is open or closed, it is by inhibiting the folding of the grip rod interconnecting the push rods that the increased distance between the push rods is firmly held unchanged. Thus, this invention is directed to a mechanism for locking the grip rod against being folded when the baby carriage is in its opened state.

Among typical examples of foldable baby carriages is one which has a pair of push rods constructed to be held relatively wide apart from each other when the baby carriage is in its open state and relatively close to each other when the carriage is in its closed state. In most cases, a grip rod is connected between such push rods. In baby carriages of the foldable type described above, such grip rod should be foldable, e.g., at its middle, so as to allow the movement of the pair of push rods. The grip rod assumes a straight state when the baby carriage is in its open state, so as to maintain the distance between the push rods at its maximum. To firmly maintain the open state of the baby carriage, it is desirable that the foldable portion of the grip rod be locked in its straight state.

SUMMARY OF THE INVENTION

Accordingly, it is an object of this invention to provide a baby carriage grip rod locking mechanism whereby the grip rod can be stably and firmly locked against being folded.

Another object of the invention is to provide a baby carriage grip rod locking mechanism so constructed that an automatic locking is effected when the baby carriage is open and that such locking can be easily cancelled, when desired, by a simple operation.

This invention is a locking mechanism which is arranged as follows. The grip rod is divided into two parts, or portions which are connected together at their respective opposed ends by a coupling while being supported for rotation around the axes of parallel rotary shafts. Lateral surfaces provided at the opposed ends of said parts of the grip rod and extending in a direction intersecting said rotary shafts, are each provided with a locking recess. A locking plate which is movable axially of said rotary shafts is installed so that it can fit simultaneously in said two locking recesses when the grip rod is in its straight state. The locking plate is urged by a spring to fit in the locking recesses for normally and automatically maintaining the locked state. An unlocking member is provided to impart an operating force which releases the locking plate from the locking recesses.

According to this invention, since the locked state is attained by the locking plate fitting in the two locking recesses, the locked state thus attained is stable and firm, almost free from fluctuation or play. Further, since the locking plate is urged by a spring in the direction in which it fits in the locking recesses, the locked state can be automatically attained when the baby carriage is unfolded into its open state, and in said locked state, the position of the locking plate is reliably maintained by the spring. Further, the locking can be easily canceled by a simple operation since it is only necessary to manipulate the unlocking member.

BRIEF DESCRIPTION OF THE DRAWINGS

FIG. 3 is a front view, in longitudinal section, showing the middle region of the grip rod of the baby carriage of FIG. 1;

FIG. 4 is a sectional view taken along the line IV—IV in FIG. 3;

FIG. 5 is a plan view partially in section of the portion shown in FIG. 3, with some wall portions constituting the upper region being removed;

FIG. 6 shows a plan view of the right-hand end portion of the grip rod 2;

FIG. 7 is a section view taken along the line VII—VII in FIG. 6;

FIG. 8 is a sectional view taken along the line VIII—VIII in FIG. 6;

FIG. 9 illustrates by means of different hatching patterns, differences in height of the grip end portion of FIG. 6;

FIG. 10 shows a front view of a coupling for interconnecting the grip end portions;

FIG. 11 is a right-hand side view of the coupling of FIG. 10;

FIG. 12 is a bottom view of the coupling of FIG. 10;

DESCRIPTION OF PREFERRED EXAMPLE EMBODIMENTS AND OF THE BEST MODE OF THE INVENTION

Figure 1:
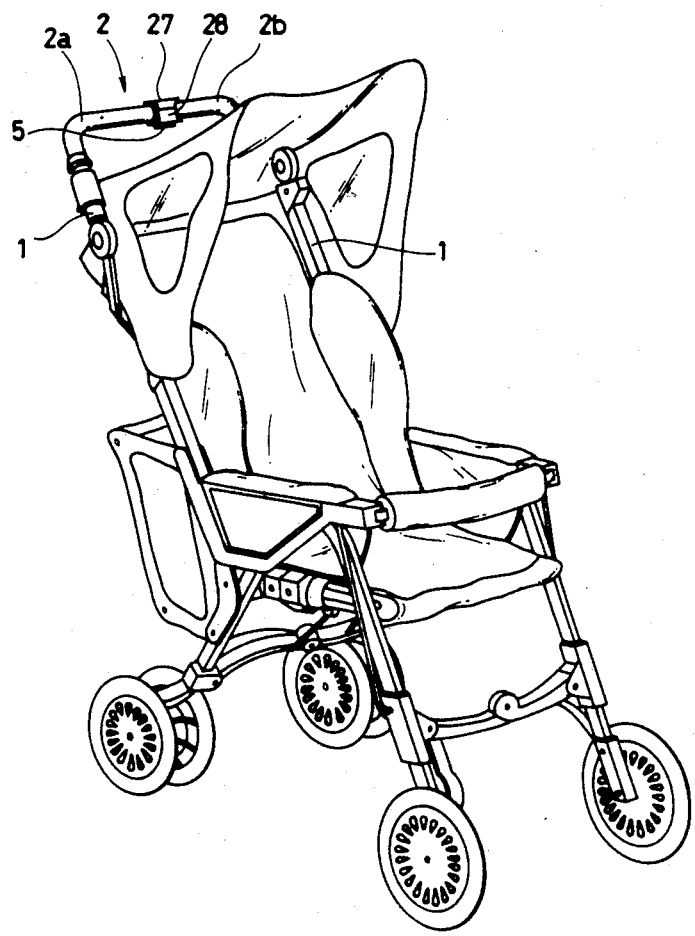
FIG. 1 is a perspective view of an example of a baby carriage having an embodiment of this invention applied thereto, showing the open state of the baby carriage.
Figure 2:
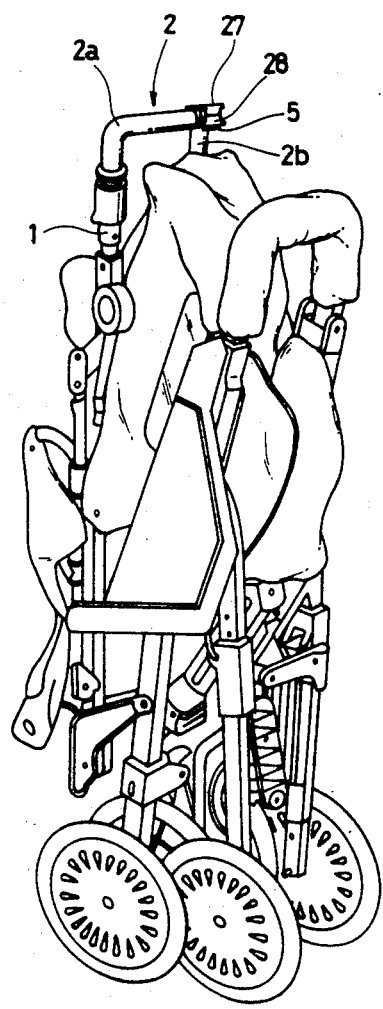
FIG. 2 is a perspective view showing the closed state of the baby carriage of FIG. 1.

FIGS. 1 and 2 show a typical example of a baby carriage to which this invention is directed. The carriage has a pair of push rods 1 and a grip rod 2 connected between said push rods 1. As shown in FIG. 1, when the baby carriage is in its open state, the pair of push rods 1 is held relatively wide apart from each other, and when the baby carriage is in its closed state, as shown in FIG. 2, the distance between the push rods 1 is decreased. To allow such movement, the grip rod 2 is constructed to be foldable at its middle. The opposite ends of the grip rod 2 have portions extending on the same axial lines as the push rods 1 and, as is clear from a comparison between FIGS. 1 and 2. These end portions are foldable with respect to the push rods 1. The detailed arrangement of this grip rod 2 will now be described.

Referring to FIGS. 3, 4, and 5, there are shown a right portion 2a and left hand portion 2b forming a divided grip rod 2, a coupling 3, a locking plate 4, and an unlocking member 5. The arrangements of these components will be described with reference to FIGS. 6 to 16, however, all figures must be taken in conjunction.

FIGS. 6 to 9 show the end of the right portion 2a of the grip rod 2. The left portion 2b, though not separately shown, is constructed so that it is mirror symmetrical with respect to the right portion 2a.

The end of the right portion 2a has a vertically extending throughgoing hole 7 for receiving a pin 6 shown in FIGS. 3 and 5. The hole 7 extends through a boss 8. The boss 8 has the greatest height among the portions hatched in FIG. 9, and a peripheral portion 9 having the same pattern of hatching is of the same height as the boss 8. Portions having an intermediate height are a C-shaped step portion 10 adjacent the inner periphery of the peripheral portion 9, and a middle step portion 11 connected to one end of the peripheral portion 9. The lowest portion is a locking recess 12 surrounded by a middle step portion 11, a C-shaped step portion 10, and a peripheral portion 9. The locking recess 12 surrounds the boss 8 and presents the same planar shape as that of one end of the locking plate 4. The bottom of the locking recess 12 is formed with a C-shaped elongated opening 13 extending therethrough.

Referring to FIGS. 10 to 12 showing a coupling 3 for interconnecting the right and left halves 2a and 2b of the grip rod 2. The coupling 3 comprises upper and lower walls 14 and 15 and a vertical wall 16 interconnecting said upper and lower walls 14 and 15 having throughgoing holes 17 and 18, respectively, for receiving the aforesaid pins 6. The lower wall 15 has a horizontally elongated window 19. This window 19 receives the unlocking member 5, whereby the unlocking member 5 extends through the lower wall 15 of the coupling 3.

Figure 13:
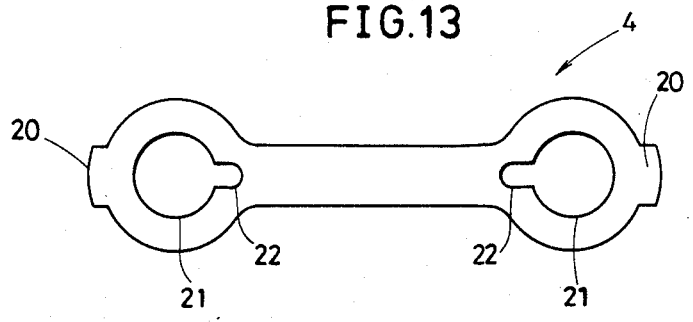
FIG. 13 is a plan view of a locking plate.
Figure 14:
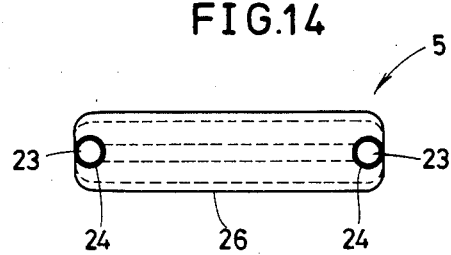
FIG. 14 is a plan view of an unlocking member.
Figure 16:
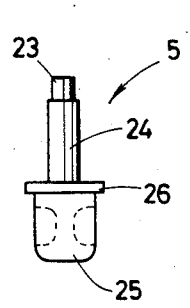
FIG. 16 is a left-hand side view of the unlocking member.
Figure 15:
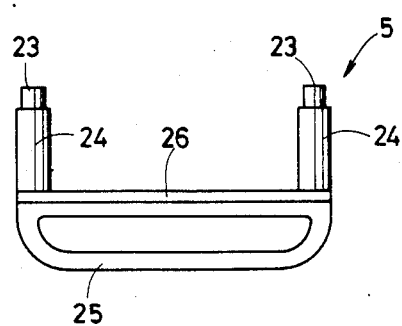
FIG. 15 is a front view of the unlocking member.

FIG. 13 is a plan view of the locking plate 4.

Each end of the locking plate 4 is shaped to fit into the planar shape of said locking recess 12. Each end of the locking plate 4 has a projection 20 and a circular throughgoing hole 21 for receiving said bosses 8 which thus guide the movement of the locking plate 4. Engagement holes 22 extend from the throughgoing holes 21 for receiving engagement shafts 23 formed at the ends of the elongated unlocking member 5. The diameter of the engagement shafts 23 is so selected that they can be received in the engagement holes 22 of the locking plate 4. The engagement shafts 23 are formed on the ends of thicker pillars 24 having a diameter such that the pillars cannot enter said engagement holes 22. The lower portion of the unlocking member 5 forms an operating member 25 extending outwardly to be manipulated directly by the operator's hand. The base of the operating member 25 has an outwardly extending shelf or edge 26 for holding the operating member 25 in place as shown in FIG. 4.

Besides the parts described above, upper and lower covers 27 and 28 are assembled to form the middle portion of the grip rod 2, as shown in FIGS. 3 through 5. A spring 29 between the coupling 3 and the locking plate 4 urges the locking plate into the locked state which will now be described with reference to FIGS. 3 to 5.

The locking plate 4 is positioned while receiving the bosses 8 of the right and left portions 2a and 2b of the grip rod 2. In this state, the spring 29 is disposed between the upper wall 14 of the coupling 3 and the locking plate 4. The spring 29 urges the locking plate 4 constantly downwardly into the locked state. The unlocking member 5 is inserted from below through the window 19 of the lower wall 15 of the coupling 3, with the engagement shafts 23 fitting in the engagement holes 22. In this state, the upper and lower covers 27 and 28 are put together to hold the coupling 3 therebetween, and this state is maintained by the pins 6. These pins 6 extend parallel to each other and provide rotary shafts for rotatably supporting the right and left portions 2a and 2b of the grip rod 2 with respect to the coupling 3. When the lower cover 28 is positioned as described above, as shown in FIG. 4, an inwardly extending rib 30 formed around the periphery of the window of the lower cover 28 engages the shelf or edge 26 of the unlocking member 5 to thereby prevent the unlocking member 5 from slipping out.

As is clear from such assembled state, the parts described above are held in their respective positions by the two pins 6 as mentioned above. Thus, the assembling operation for obtaining the construction of this embodiment is simple.

FIGS. 3 to 5 correspond to the opened state of the baby carriage shown in FIG. 1, with the locking applied to maintain the straight state of the grip rod 2. That is, the locking plate 4 fits into the locking recesses 12 (FIGS. 6 to 9). In this state, the projections 20 on the locking plate 4 are positioned between the C-shaped step portion 10 and the peripheral portion 9 higher than the locking recess 12, whereby right and left portion 2a and 2b are prevented from turning around the respective pin 6 relative to the locking plate 4. Thus, the straight state of grip rod 2 is maintained. In addition, as shown in FIG. 5, the middle step portions 11 of the right and left rod parts 2a and 2b abut against the vertical wall 16 of the coupling 3, whereby one terminal end of rotation of the right and left rod portions or parts 2a and 2b around the pins 6 is defined.

Figure 17:
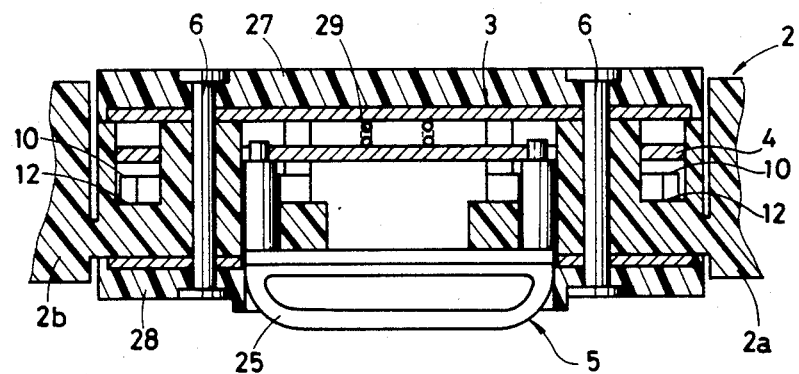
FIG. 17 is a sectional view similar to that of FIG. 3, but illustrating the unlocking member pushed in for unlocking.

When it is desired to cancel the aforesaid locking, this can be attained simply be upwardly pushing the unlocking member 5 as shown in FIG. 17. The force for pushing in the unlocking member 5 inwardly can be easily imparted directly by the hand which grips the covers 27 and 28. When the unlocking member 5 is pushed in against the force of the spring 29, the locking plate 4 is displaced upwardly and disengaged from the locking recesses 12. The position which the locking plate 4 assumes is above the level of the C-shaped step portion 10 and middle step portion 11 (FIG. 6) which indicate the intermediate height. Therefore, the rotation of the right and left portions 2a and 2b of the grip rod 2 around this respective pins 6 relative to the coupling 3 is permitted by the locking plate 4 which is guided by the bosses 8 even in this unlocking position.

With the unlocked state shown in FIG. 17 maintained, the folding operation of the baby carriage is performed. More particularly, this folding operation is effected with the hand gripping the region where the upper and lower covers 27 and 28 are provided; thus, during this folding operation it is easy to impart a force which upwardly pushes in the unlocking member 5. As a result of such folding operation, the baby carriage changes from the FIG. 1 to the FIG. 2 state. The movement which takes place during this folding operation is described in my Japanese Patent Application No. 132136/1979 (Japanese Laying-Open Patent Application No. 57574/1981) entitled "Baby Carriage" (see U.S. Pat. No. 4,317,581, UK Pat. No. 2061195, and European Pat. No. 0027374).

Figure 18:
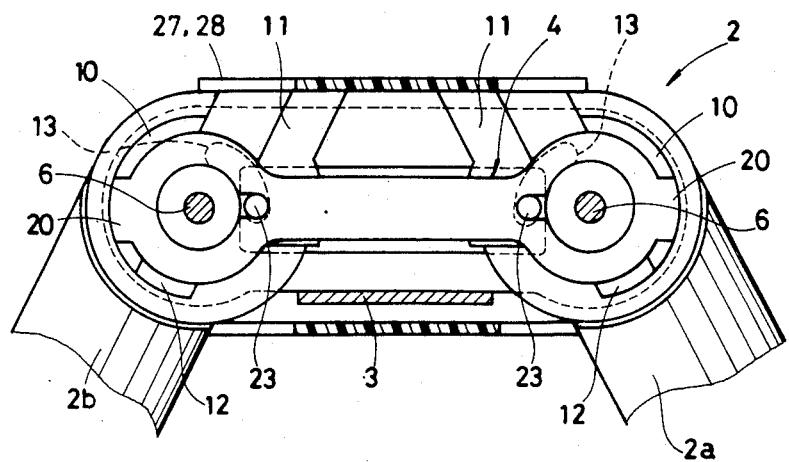
FIG. 18 is a view similar to that shown in FIG. 5, but illustrating the grip rod in its folded state.

The state of FIG. 18 corresponds to the closed or folded state of the baby carriage. Since the force which pushes in the unlocking member 5 has been removed, even if the spring 29 acts to downwardly displace the locking plate 4, the latter will remain resting on the C-shaped step portion 10 and middle step portion 11 which indicate the intermediate height. In this state, the right and left portions 2a and 2b of the grip rod 2 are so positioned that 11 abut against the lateral walls of the covers 27 and 28, whereby one of the respective terminal ends of their rotary ranges is defined. In addition, though not clearly shown in FIG. 18, with attention paid to the positional relation between the pillars 24 shown in FIGS. 15 and 16 of the unlocking member 5 and the elongated openings 13, it is seen that at both terminal ends of the folding operation of the grip rod 2 (FIGS. 5 and 18), the respective pillar 24 is positioned at either longitudinal end of the elongated opening 13. Thus, such combination of the pillar 24 and the elongated opening 13 also defines the range in which the right and left portions 2a and 2b of the grip rod 2 are rotatable relative to the coupling 3.

When the baby carriage is changed from the closed state shown in FIGS. 2 and 18 back to the opened state shown in FIGS. 1 and 3, the grip rod 2 is straightened. When this straight state is obtained, the locking movement by the locking plate 4 can be automatically attained. That is, since the locking plate 4 is urged by the spring 29 in the direction in which it fits in the locking recesses 12, the ends of the locking plate 4 will simultaneously fit in the respective locking recesses 12 when the locking plate 4 is aligned with the locking recesses 12.

The invention has been described so far in connection with the illustrated embodiment, but the invention, when embodied, is not limited to the embodiment described above. For example, the configurations of the locking plate and locking recesses could be variously changed. Further, the foldable baby carriage to which the invention is applied is not limited to the type shown in FIGS. 1 and 2. The invention is applicable to any type of baby carriage provided that it has a grip rod which is foldable at its middle.

What is claimed is:

1. A locking mechanism for a baby carriage grip rod interconnecting a pair of push rods (1) of a foldable baby carriage, comprising coupling means including two parallel shafts (6) for foldably interconnecting two portions (2a, 2b) into which said grip rod (2) is divided and supported for rotation around said shafts (6) each grip rod portion (2a, 2b) having a boss (8) with a hole (7) through which the respective shaft (6) extends, two locking recesses (12) each formed in one lateral surface of an end section of the respective one of said grip rod portions, said locking recesses extending in a plane intersecting said parallel shafts, a locking plate (4) guided at each end by said respective boss for moving axially relative to said shafts, said locking plate being capable of simultaneously fitting into both locking recesses for locking said portions (2a, 2b) of said grip rod in a single straight locked state, a spring (29) for urging said locking plate in the direction in which it fits in said locking recesses for automatically maintaining said locked state, and an unlocking member (5) for imparting an operating force for disengaging said locking plate from said locking recesses against the force of said spring.

2. The locking mechanism of claim 1, wherein said unlocking member is installed in said coupling means, said unlocking member having an operating portion (25) projecting outside said coupling means for enabling a hand gripping said coupling means to perform an unlocking operation.

3. The locking mechanism of claim 1, including means for defining a range of rotation of said portions (2a, 2b) of said grip rod relative to said coupling means.

4. The locking mechanism of claim 3, wherein said rotation range defining means comprise an arrangement wherein a portion (16) of said coupling means and ends (11) of said portions (2a, 2b) of said grip rod abut against each other.

5. The locking mechanism of claim 3, wherein said rotation range defining means comprise pillar means (24) in said unlocking member and an elongated hole (13) in each of said portions of said grip rod, said pillar means (24) extending through said elongated holes for permitting a relative rotation of said grip rod portions to an extend determined by a length of said elongated holes.

6. The locking mechanism of claim 1, wherein said unlocking member has an elongated shape including engagement shafts (23) provided at its ends, said locking plate having holes (22) for receiving said engagement shafts for transmitting movement of said unlocking member to said locking plate.

7. The locking mechanism of claim 1, wherein said unlocking member (5) has laterally projecting means (26) cooperating with said coupling means for holding said unlocking member (5) in place against the force of said spring (29).

8. The locking mechanism of claim 7, wherein said coupling means comprise cover members (27, 28), one cover member (28) having a window therein through which said unlocking member extends, said laterally projecting means (26) of said unlocking member (5) having an edge reaching under said window for holding said unlocking member in place against the force of said spring.

9. The locking mechanism of claim 1, wherein said coupling means comprise cover members (27, 28), said parallel shafts (6) extending through said bosses, also extending through said cover members for holding said locking mechanism together, but without projecting outside said cover members.

* * * * *